(12) United States Patent
Young

(10) Patent No.: US 12,156,613 B2
(45) Date of Patent: Dec. 3, 2024

(54) HEAT TRAY SYSTEMS AND PORTABLE HEATING AND MONITORING TECHNOLOGIES

(71) Applicant: FOREVER YOUNG INTERNATIONAL, INC., Las Vegas, NV (US)

(72) Inventor: Daniel L. Young, Henderson, NV (US)

(73) Assignee: FOREVER YOUNG INTERNATIONAL, INC., Las Vegas, NV (US)

(*) Notice: Subject to any disclaimer, the term of this patent is extended or adjusted under 35 U.S.C. 154(b) by 920 days.

(21) Appl. No.: 17/436,047

(22) PCT Filed: May 3, 2019

(86) PCT No.: PCT/US2019/030740
§ 371 (c)(1),
(2) Date: Sep. 2, 2021

(87) PCT Pub. No.: WO2019/213621
PCT Pub. Date: Nov. 7, 2019

(65) Prior Publication Data
US 2022/0273135 A1    Sep. 1, 2022

Related U.S. Application Data

(60) Provisional application No. 62/666,693, filed on May 3, 2018.

(51) Int. Cl.
A47J 36/28 (2006.01)
A47J 36/32 (2006.01)
F24V 30/00 (2018.01)

(52) U.S. Cl.
CPC ............. *A47J 36/28* (2013.01); *A47J 36/321* (2018.08); *F24V 30/00* (2018.05)

(58) Field of Classification Search
CPC ....... A47J 36/28; B65D 81/3484; F24V 30/00
USPC .......................... 126/263.01, 263.06, 263.07
See application file for complete search history.

(56) References Cited

U.S. PATENT DOCUMENTS

| | | | | |
|---|---|---|---|---|
| 2,608,861 | A * | 9/1952 | Knipper | G01K 1/14 374/E1.018 |
| 4,510,919 | A | 4/1985 | Benmussa | |
| 4,741,324 | A * | 5/1988 | Ina | A47J 36/28 126/263.06 |
| 2006/0005827 | A1 | 1/2006 | Consoli et al. | |
| 2011/0268153 | A1* | 11/2011 | He | A47J 45/068 374/E7.004 |
| 2015/0059729 | A1* | 3/2015 | Tinker | F24V 30/00 126/263.02 |
| 2015/0289716 | A1* | 10/2015 | Young | B65D 25/10 126/263.05 |

(Continued)

OTHER PUBLICATIONS

"About Lava Gel" webpage, Lava Gel USA (Year: 2017).*

(Continued)

*Primary Examiner* — Vivek K Shirsat
(74) *Attorney, Agent, or Firm* — Snell & Wilmer L.L.P.

(57) ABSTRACT

The present invention relates to exothermically heated and portable heater tray assemblies, systems, their use, including related methods of manufacture and kits. In addition, mobile applications utilized in conjunction with the heater tray assemblies and systems contemplated herein.

19 Claims, 9 Drawing Sheets

(56) References Cited

U.S. PATENT DOCUMENTS

2017/0042374 A1* 2/2017 Young .............. B65D 81/3484
2018/0038737 A1* 2/2018 Hedlund .............. G01J 5/0205

OTHER PUBLICATIONS

Zhang et al., "Copper Compounds" from Ullman's Encyclopedia of Industrial Chemistry, pp. 11-12 (Year: 2016).*
International Search Report and Written Opinion issued on Jul. 17, 2019 in counterpart International Patent Application No. PCT/US2019/030740 (8 pages, in English).

* cited by examiner

HEAT TRAY SYSTEMS AND PORTABLE HEATING AND MONITORING TECHNOLOGIES

CROSS-REFERENCE TO RELATED APPLICATIONS

This application is a National Stage of and claims priority to International Patent Application No. PCT/US2019/030740, filed on May 3, 2021, which claims the benefit of priority to U.S. Provisional Patent Application No. 62/666,693, filed May 3, 2018, the contents of each of which are hereby incorporated by reference in their entirety.

BACKGROUND

In catering and mobile food services, current approaches to heating and maintaining food in a heated state include portable units that burn chafing fuels. See, e.g., blue flamed devices from Sterno. However, in recent years, this conventional approach has led to many problems, including burnt and dried out food and buildings such as hotels burning for inattention to the flamed devices. When catering takes place outside, fires that originate from the flames of the units also have started fires that have destroyed recreational lands. Kids have also been known to be attracted by the blue flames of the units, reach and touch, and then sustain critical burn injuries or more. As a result of these complications, many fire marshals are moving to ban these portable flamed heating units.

Some in the industry have resolved to overcome these issues by using electrically controlled options such as induction coils. However, this approach is expensive, requires more technological resources, has its own safety complications, and it not truly portable nor flexible in application.

As a result, there is a need for a safety, simple, and cost-effective portable heating system that overcomes these and other issues plaguing the art. The present disclosure addresses these and other related needs in the art.

SUMMARY

Heater tray assemblies are provided herein comprising, a tray, wherein the tray contains a powdered expandable exothermic reactant sealed between a surface of the tray and a permeable membrane layer; a barrier layer positioned over the permeable membrane and attached to the tray to enclose the membrane layer between the tray and the barrier layer; an activation port positioned in the barrier layer providing fluid access to the permeable membrane; and an adjustable tab positioned over the activation port to provide a seal of the activation port that prohibits fluid entry when in a closed position.

Often according to the presently contemplated embodiments, the permeable membrane layer comprises a barrier layer and a permeable membrane window. Also often, the barrier layer is positioned to cover the permeable membrane window and the barrier layer is not sealed to the tray.

In frequently included embodiments, the tray is water impermeable. Also frequently, the tray is comprised of a biodegradable or compostable material. According to often included embodiments, the entire heater tray assembly is comprised of biodegradable or compostable materials.

According to the presently contemplated embodiments, wherein the exothermic composition often forms an exothermic gel upon mixing with an activator solution. Often this gel is an expandable gel such as LAVA GEL®.

According to the presently contemplated embodiments, the activator solution comprises an electrolyte solution.

According to the presently contemplated embodiments, the adjustable tab comprises a peelable tab that can be adjusted or removed and replaced over the activation port. Often the adjustable tab is movable between open and closed positions relative to the activation port.

According to the presently contemplated embodiments, a heater tray system is provided comprising the heater tray assembly of any preceding claim, wherein the system further comprises a dissolvable electrolyte composition, optionally together with a stir stick. Often the stir stick comprises the dissolvable electrolyte composition. Also often, the dissolvable electrolyte composition comprises a colored dissolvable electrolyte composition that forms an electrolyte solution having a pre-determined color when the dissolvable electrolyte composition is dissolved. Often the tray comprises a plurality of ramps extending from a lip of the tray to an interior of the tray, wherein the plurality of ramps comprise corresponding opposite ramps. Often, the dissolvable electrolyte composition is comprised in a liquid permeable membrane or a soluble membrane According to the presently contemplated embodiments, the permeable membrane often comprises a three-dimensionally sealed permeable membrane, and wherein the heater tray assembly comprises one or more sectors of free exothermic reactant sealed in a sector pocket formed between the tray and the three-dimensionally sealed permeable membrane that is bonded to two or more contours or surfaces of the tray, and wherein the two or more contours or surfaces of the tray includes an interior surface of the tray.

According to certain embodiments, the barrier film comprises a peelable flap and a film rim.

According to the presently contemplated embodiments, a method of using a heater tray assembly is provided comprising introducing an electrolyte solution to the exothermic composition. Often, according to such embodiments an exothermic reaction is initiated in the heater tray assembly and a container containing contents to be heated is placed on the activated heater tray assembly, and wherein the exothermic reaction produces delivers heat to the container for a pre-determined duration of time at a pre-determined temperature range thereby heating the contents of the container.

According to related presently contemplated embodiments, the pre-determined duration is greater than two hours and the pre-determined temperature is greater than 140 F, wherein the contents of the container are heated to at least 140 F for the pre-determined duration.

According to the presently contemplated embodiments, methods of manufacturing a heater tray assembly are provided comprising molding the tray, adding the exothermic reactant, and assembling the tray, the permeable membrane, the barrier layer, and the adjustable tab. Often, the method comprises thermoforming a heater tray having a plurality of ramps extending from a lip of the tray to the interior of the tray, wherein the plurality of ramps comprise corresponding opposite ramps, introducing an exothermic reactant to the interior of the tray; bonding the permeable membrane around the lip of the tray, down each of the plurality of ramps and between the corresponding opposite ramps, thereby forming a plurality of sealed sector pockets; and bonding a barrier layer to the lip of the tray and covering the permeable membrane, wherein the barrier layer comprises a peelable flap and a film rim.

According to the presently contemplated embodiments, the system often further comprises a data collection device adapted to measure a temperature data pertaining to at least a portion of the heater tray assembly and communicate the temperature data to a mobile device. In related embodiments, the system further comprises a mobile application resident on the mobile device adapted to collect and/or interpret the temperature data.

According to the presently contemplated embodiments, the heater tray system is provided such that the heater tray assembly or the heater tray system comprises a leuco dye that becomes visible at a predetermined temperature. Often, the leuco dye comprises two or more different leuco dyes, each becoming visible at different pre-determined temperatures. Often, the leuco dye comprises three or more different leuco dyes, each becoming visible at different pre-determined temperatures. Often these leuco dyes are positioned at different locations on the heater tray assembly or the heater tray system.

A heater tray assembly is provided herein. Often, the heater tray assembly comprises one or more sectors of free exothermic reactant sealed in a sector pocket formed between a tray and a three-dimensionally sealed permeable membrane that is bonded to two or more contours or surfaces of the tray, and wherein the two or more contours or surfaces of the tray includes an interior surface. Often, the heater tray further comprises a barrier film comprising a peelable flap and a film rim. In certain frequent embodiments, the entire heater tray assembly is comprised of recyclable or compostable materials.

In certain embodiments a method of using a heater tray assembly is provided herein. Often, in such methods an exothermic reaction is initiated in the heater tray assembly and a container containing contents to be heated is placed on the activated heater tray assembly, and wherein the exothermic reaction produces delivers heat to the container for a pre-determined duration of time at a pre-determined temperature range thereby heating the contents of the container. In frequent embodiments, the pre-determined duration is greater than two hours and the pre-determined temperature is greater than 140° F., wherein the contents of the container are heated to at least 140° F. for the pre-determined duration. In frequent embodiments, the pre-determined duration is greater than two hours and the pre-determined temperature is greater than 165° F., wherein the contents of the container are heated to at least 165° F. for the pre-determined duration. In frequent embodiments, the pre-determined duration is greater than two hours and the pre-determined temperature is greater than 170° F., wherein the contents of the container are heated to at least 170° F. for the pre-determined duration. In frequent embodiments, the pre-determined duration is greater than two hours and the pre-determined temperature is greater than 140° F., 145° F., 150° F., 155° F., 160° F., 165° F., 170° F., 175° F., 180° F., 185° F. or 190° F., wherein the contents of the container are heated to at least 140° F., 145° F., 150° F., 155° F., 160° F., 165° F., 170° F., 175° F., 180° F., 185° F. or 190° F. for the pre-determined duration. In certain frequent embodiments the pre-determined temperature is higher than the temperature of the contents of the container. Most frequently the container is a container holding food such as a food tray and the contents comprise a consumable food item.

Also in frequent embodiments, a method of manufacturing a heater tray assembly substantially is provided. Often, the method comprises thermoforming a heater tray having a plurality of ramps extending from a lip of the tray to the interior of the tray, wherein the plurality of ramps comprise corresponding opposite ramps, introducing an exothermic reactant to the interior of the tray; bonding a permeable membrane around the lip of the tray, down each of the plurality of ramps and between the corresponding opposite ramps, thereby forming a plurality of sealed sector pockets; and bonding a barrier layer to the lip of the tray and covering the permeable membrane, wherein the barrier layer comprises a peelable flap and a film rim. In certain frequent embodiments, the method begins using a pre-formed or pre-existing tray such that the contemplated methods do not require forming the tray.

In certain embodiments kits are provided comprising an insulated container and a heater tray assembly.

These and other embodiments, features, and advantages will become apparent to those skilled in the art when taken with reference to the following more detailed description of various exemplary embodiments of the present disclosure in conjunction with the accompanying drawings.

BRIEF DESCRIPTION OF THE DRAWINGS

The skilled person in the art will understand that the drawings, described below, are for illustration purposes only.

DETAILED DESCRIPTION

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more."

As used herein, the term "and/or" may mean "and," it may mean "or," it may mean "exclusive-or," it may mean "one," it may mean "some, but not all," it may mean "neither," and/or it may mean "both."

It is understood that the term, "activator solution" or "activator liquid" can mean water, water and an electrolyte, or other aqueous solution that when contacted with any of the exothermic compositions of this disclosure initiates, increases or renews an exothermic reaction.

As used herein, an "exothermic composition" or "exothermic reactant" may be referred to as an "exothermic composition" or "exothermic reactant" prior to, during, or after initiation of an exothermic reaction using the composition.

It is understood that "galvanic alloy" can mean a metal that is made by combining two or more metallic elements, including combining two or more different metal salts. The combination is often via a known means for alloying, including for example using an alloying process using a ball mill or the like.

As used herein "heat tray" and "heater tray" are intended to be interchangeable terms.

It is understood that the term "blended" can mean blending two or more things together to form a mixture, such as a blended powder (uniformly or otherwise), homogeneous mixture or homoegenous powder. A blender that can be used to "blend" two or more things together can include commercially available mixers and blenders, such as drum mixers, braun mixers, ribbon blenders, blade blenders, V-shaped blenders, batch mixers, or the like.

As used herein "food tray" is intended to refer primarily to something adapted to hold, store, cook, and/or serve food. This is only an example of the type of target container that can be heated using the heater tray assemblies of the present disclosure, as such, the use of food tray is intended to refer to a target container that contains an item to be heated other than food and a container prior to contents being added or after the contents have been removed.

Figure 1:
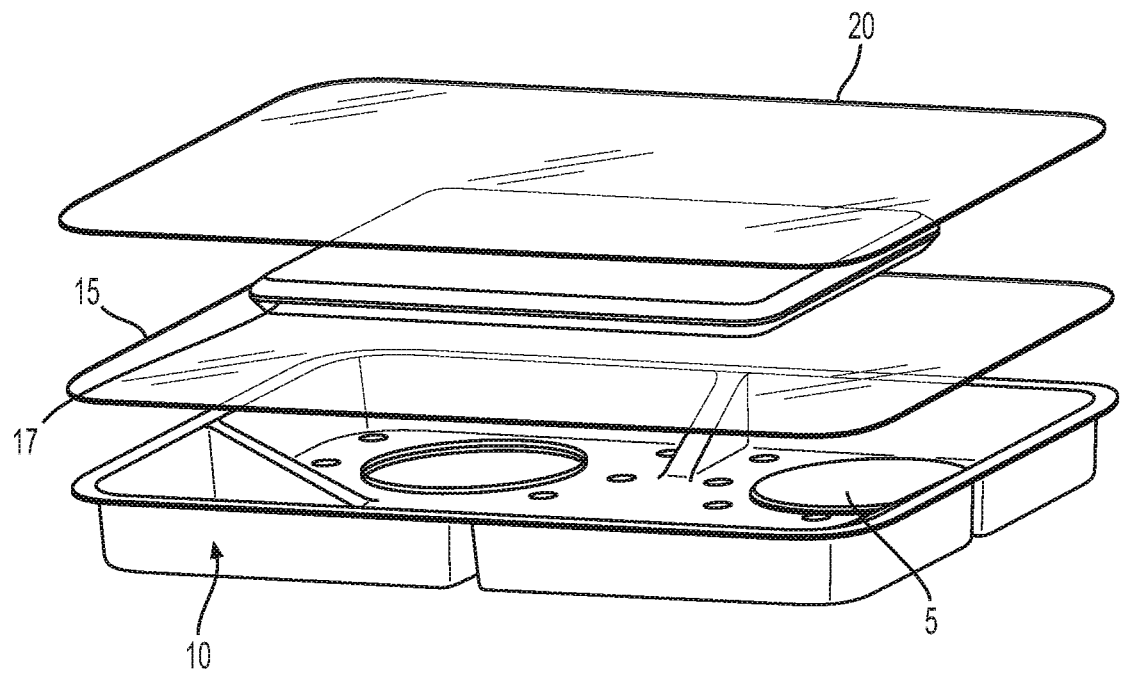
FIG. 1 depicts an embodiment of a heat tray assembly of the present disclosure.
Figure 2:
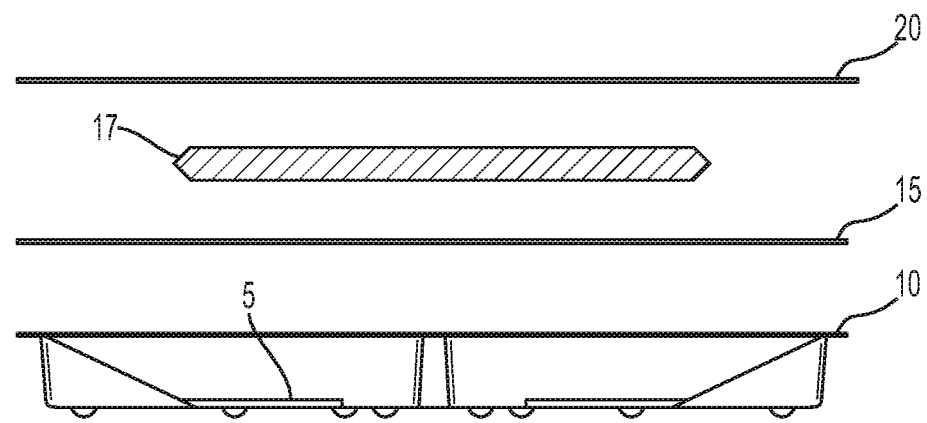
FIG. 2 illustrates another view of the heat tray assembly embodiment depicted in FIG. 1.

FIGS. 1 and 2 depict an embodiment of a heat tray assembly of the present disclosure. As depicted, a tray is included including an exothermic composition positioned therein. In the depicted embodiment, the exothermic composition is positioned in multiple locations or quadrants of the tray. Though a square or rectangle arrangement is depicted, circular, oval or other arrangements are contemplated. The heat tray is most frequently formed of thermoformed plastic, preferably a recyclable or compostable polymer. Often, the heat tray is comprised of a biopolymer such as co-polymerizing lactide with aliphatic polyester (CPLA).

The exothermic composition is most frequently a powder or dry particle composition provided in free-flowing form to the heat tray. In less frequent embodiments, the exothermic composition is provided in one or more liquid permeable pouch(s) positioned in the interior of the heat tray.

A permeable membrane (occasionally referred to herein as a non-woven layer, film or membrane) that is permeable to water or another liquid activator is positioned over the heat tray. This permeable membrane may be sealed to a circumferential perimeter (e.g., a lip, edge, or inside or outside) of the tray. In the most frequent embodiments the permeable membrane is heat sealed or heat bonded with the heat tray. The permeable membrane may also be adhered to the heat tray. The permeable membrane is bonded to the tray in a manner that confined exothermic reactant within a sector or quadrant pocket formed between the permeable membrane and the surface of the heat tray. This quadrant pocket is contiguously sealed about its periphery of a bond (or adhesive or mechanical interlock) between the permeable membrane and the heater tray. The heater tray at least contains one sector pocket, containing an exothermic reactant of the type contemplated herein. More frequently, the heater tray includes two or more sector pockets, each containing an exothermic reactant of the type contemplated herein. Often, the heater tray includes four or more sector pockets, each containing an exothermic reactant of the type contemplated herein. In frequent embodiments, the permeable membrane is comprised of a non-woven fabric, though a variety of other permeable materials and material arrangements are contemplated. In frequent embodiments, the permeable membrane is comprised of recyclable or compostable components such as a polymer such as polylactic acid polymer (PLA) and/or wood fiber. Generally, the permeable membrane is constructed of a material and arranged such that it prevents the escape of exothermic reactant (once positioned in the interior of the heat tray) through the permeable membrane or transition through the membrane from one quadrant/sector to another quadrant/sector.

In the depicted embodiment, a pouch of activator liquid is positioned above the permeable layer. This activator pouch contains an activator solution such as water. The pouch is frangible through tearing or another mechanism such as puncture, opening, or unsealing. A separate activating mechanism may be provided with the heat tray assembly, such as one or more pull-strips that can be pulled to create a tear or opening in the pouch to release the activator solution. In certain embodiments, in order to activate the exothermic reactant, a user removes a seal from the barrier layer to unseal layer and then begins pulling, twisting, turning, or moving on handle segment of starter element contained in the pouch of activator liquid. A variety of other mechanisms, arrangements of elements, and processes of introducing the activator liquid to the exothermic composition are also contemplated. Two or more pouches of activator liquid may be included in the contemplated heater tray assemblies.

Figure 3:
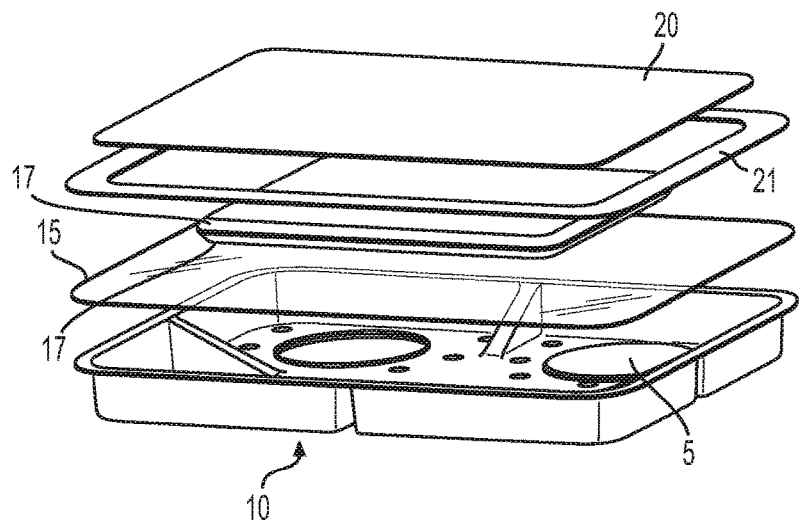
FIG. 3 depicts another embodiment of a heat tray assembly of the present disclosure with a peelable top film.

As depicted in FIGS. 1-3, a barrier film 20 is positioned above the activator. Often this barrier film is sealed to a circumferential perimeter (e.g., a lip, edge, or inside or outside) of the tray or the permeable membrane on the tray. In certain embodiments the layer is provided with the pouch of activator liquid. This barrier film may be a water impermeable film, and often the barrier film hermetically-seals the contents of the heat tray. Often the barrier film is liquid impermeable. Also often the barrier film is gas impermeable, such as oxygen impermeable. Frequently, the barrier film is both oxygen impermeable and water impermeable. In the most frequent embodiments, the barrier film is comprised of a biopolymer that is recyclable or compostable. Though not intending to be bound to any theory of operation, the barrier film preserves the interior of the tray, for example, in an oxygen-deficient environment to preserve reactants of the activator. In an embodiment such as that depicted in FIG. 3, this film may be provided in a manner that can be opened without tearing or puncturing the film. The embodiment of FIG. 1 may be provided with a peelable flap/film as well. As depicted in FIG. 3, the barrier film/layer 20 is comprised of a flap that is peelable away from a film rim or flange 21 surrounding the heat tray 10 to provide access to the contents or interior of the heat tray. The flange 21 is a circumferential portion of the barrier layer that often provides a lip of material that overhangs the interior of the heat tray when the flap of the barrier layer 20 is opened (e.g., a splash skirt or flange). In certain embodiments a pouch of activator liquid 17 is positioned interior to the barrier film 20. The barrier film protects against inadvertent activation and optionally also aids in providing a precise exothermic reaction and heat delivery by the heat tray 10. In certain embodiments, the barrier film 20 is opened to provide access to the pouch of activator liquid 17 or permit placement or replacement of a pouch of activator liquid 17. This barrier film may be resealable to the tray or the flange. Also, the barrier film may be provided with a laser etched portion that is frangible to provide access to the contents or interior of the heat tray. Releasable layer or laser etched. In operation, the flange 21 acts as a splash skirt over the non-woven layer. When activator solution is introduced to or poured on the non-woven layer, the overhanging nature of the flange acts to prevent spill-over of the activator liquid outside of the heat tray 10.

Figure 4:
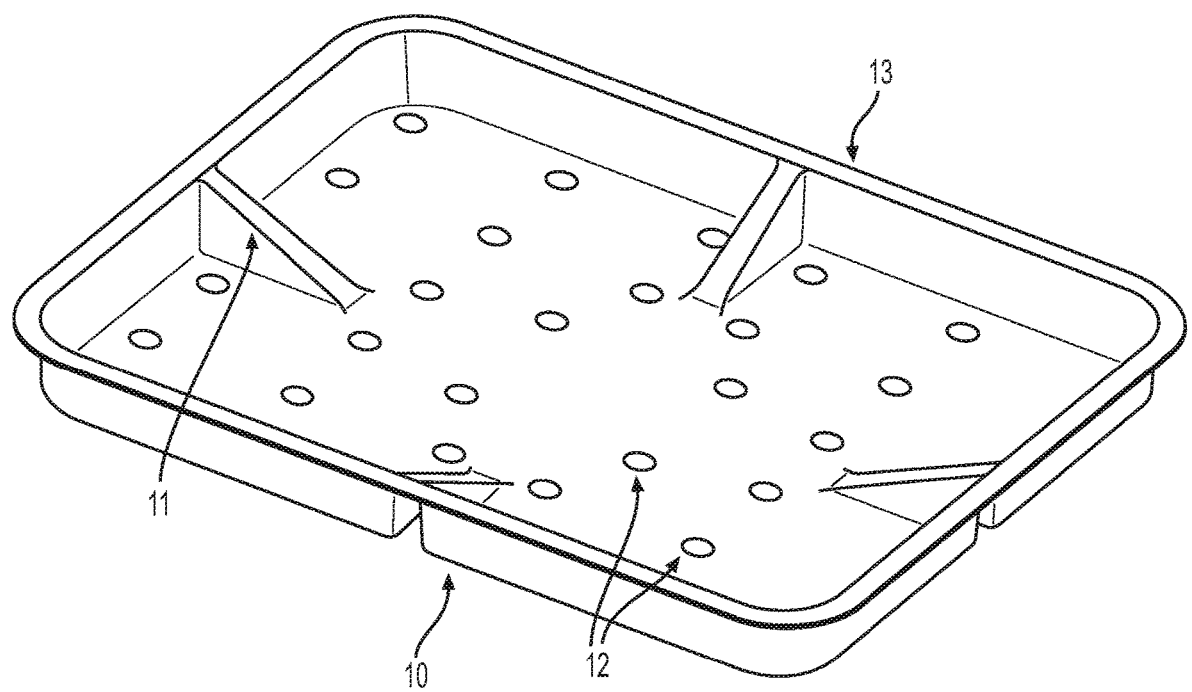
FIG. 4 illustrates an exemplary tray useable in the exemplified heat tray assembly.
Figure 5A:
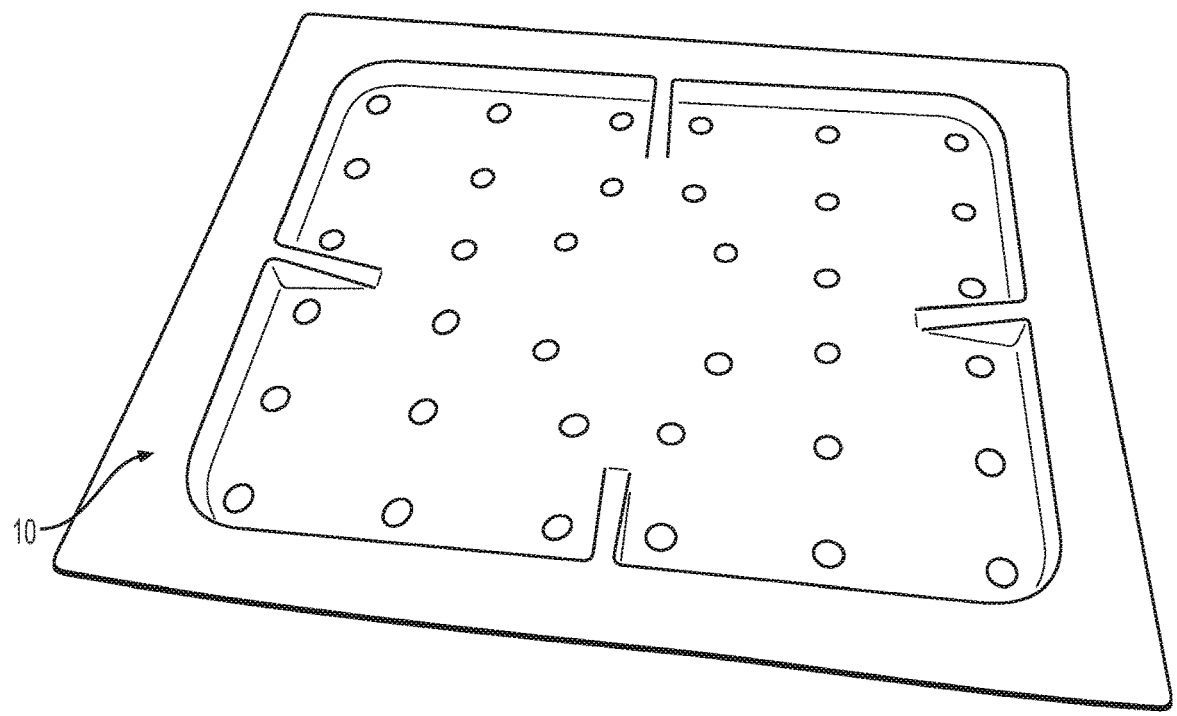
FIG. 5A provides a top-view of a mold for an exemplary heat tray.
Figure 5B:
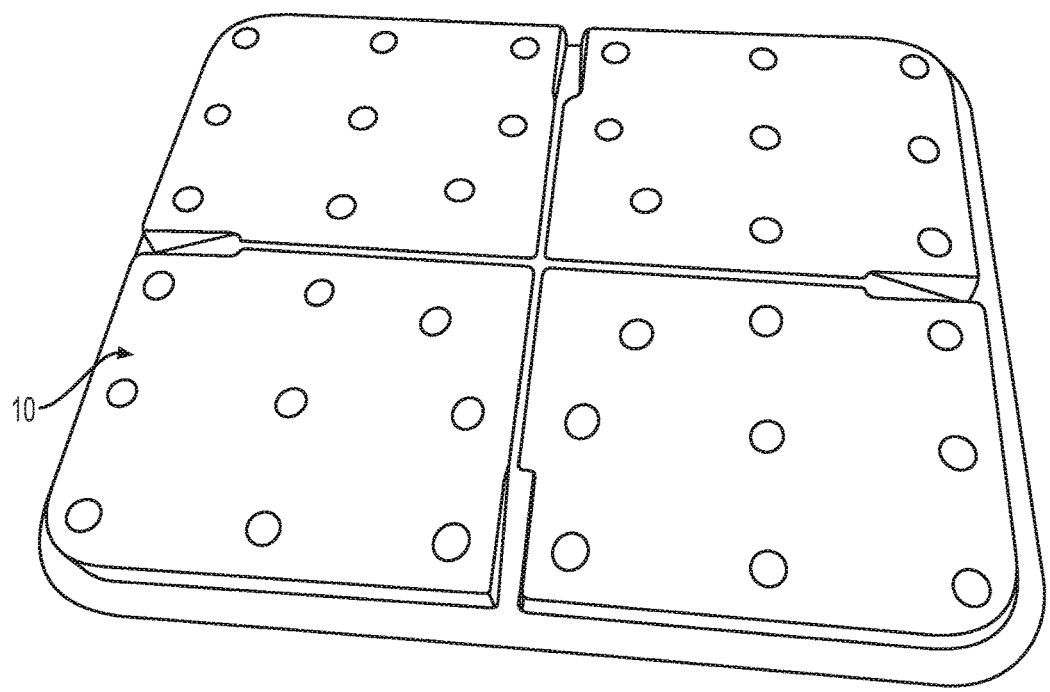
FIG. 5B provides a bottom view of an exemplary tray prepared using the mold of FIG. 5A useable in the exemplified heat tray assembly.
Figure 6:
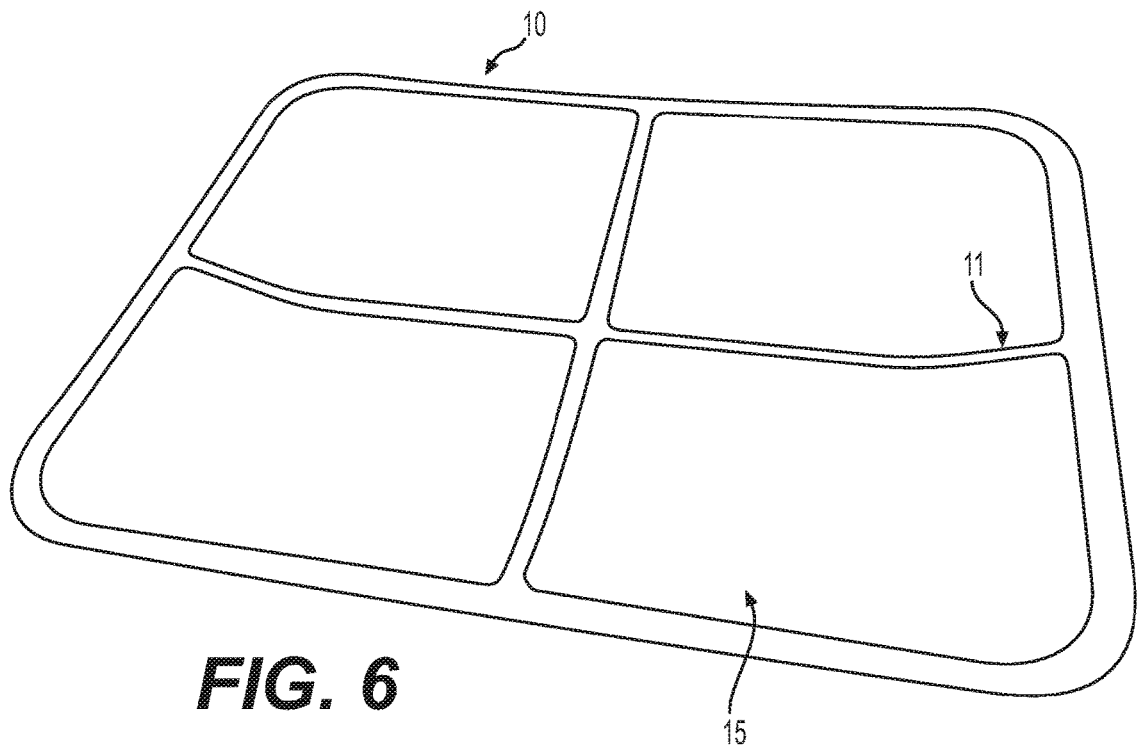
FIG. 6 illustrates an exemplary tray useable in the exemplified heat tray assembly, with a non-woven layer covering the tray.

FIGS. 4, 5B and 6 depict further aspects of the physical arrangement of an exemplary heat tray 10. As shown in FIG. 4, the tray includes a plurality of ramps 11 that extend from the lip of the heat tray 13 to the bottom of the interior of the heat tray. At the bottom interior surface of the heat tray, a series of dimples are provided in the pictured embodiment. These dimples 12 are provided for one or more purposes, including structural, aesthetic and/or functional purposes. For example, dimples 12 may act to collect small portions of exothermic reactant in the recess of each dimple. Also for example, the dimples 12 act to raise the heat tray off of an exterior surface where the heat tray is placed to minimize the amount of conductive heat loss to that supporting surface when the exothermic composition is activated. These dimples 12 are formed in the bottom layer and extend below the main horizontal plane of the heat tray bottom interior surface. Often, when the heat tray is placed on a surface such as a table, these dimples 12 hold the main horizontal plane of the heat tray bottom interior surface above the table such that the bottom of the dimples 12 contact the table but the main horizontal plane is held above the table. While there are four ramps 11 depicted in the embodiment of FIG. 4, there may be more or fewer of these ramps 11. In practice each ramp is often positioned opposite of another ramp on the other side of the heat tray. In frequent embodiments, no dimples are placed in the plane extending between two corresponding/opposite ramps. As explained below, each ramp 11 provides a surface for the bonding or adherence of the permeable membrane 15. FIG. 4 shows a depiction of an actual heat tray including the features described herein.

FIG. 6 depicts an exemplary heat tray having a permeable membrane bonded to the tray. The light areas represent unbonded permeable membrane. The dark lines on the permeable membrane represent areas where it is bonded to the heat tray. As can be seen in this embodiment, four partitions are present in the depicted heat tray. If the heat tray is provided in a different physical arrangement such as circular or oval, the number and location of the "partitions" will be different but parallel the same general arrangement to break the entire area of the heat tray into a pre-determined number of partitions for locating an exothermic reactant. Each of these partitions contains an exothermic reactant, most frequently in free-flowing powder or particle form. The sealed partitions act to contain a predetermined amount of exothermic reactant in each partitions. The partitions/sector arrangement of the exothermic reactant described and depicted herein preserves the general placement of the exothermic reactant while in transit to ensure even reaction and heating when the heat tray assembly is in use. For example, when a reactant is provided in powder form, it would be prone to collect in one side of the tray versus another side if stored at an angle. Such an arrangement might lead to delayed, failed, partial or problematic exothermic reactions or an uneven production of heat relative to the top surface of the tray.

As can be seen in FIG. 6, the permeable membrane is in a 3-dimensional arrangement such that it is bonded to the peripheral upper lip of the heat tray and also bonded across the length of each ramp descending to the interior bottom surface of the heat tray. This bonding extends across the bottom of the tray to the corresponding ramp where it continues up that corresponding ramp to the upper opposite peripheral lip of the heat tray. Each quadrant remains unbonded containing free-flowing exothermic reactant. In use, an activator solution is added to the interior of the tray (e.g., poured into the interior middle of the tray, for example, as described in connection with the embodiment of FIGS. 12 13) and it diffuses or flows out to each quadrant evenly to begin and sustain the exothermic reactant activation and continued reaction process.

Figure 7:
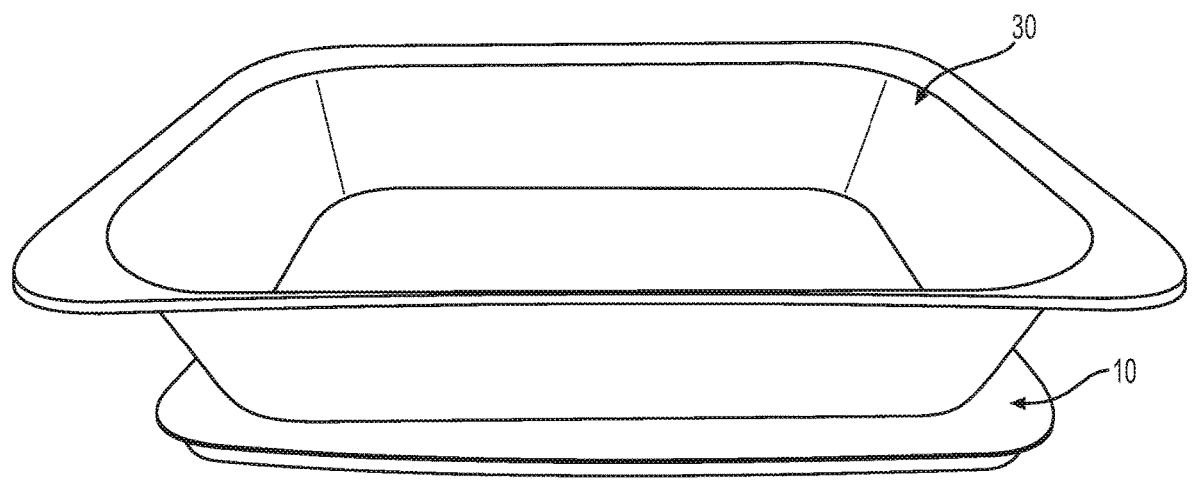
FIG. 7 depicts a target item (e.g., food) tray positioned on top of an exemplary heat tray assembly of the present disclosure.

FIG. 7 depicts a food tray 30 positioned on top of a heat tray assembly 10. In the exemplified embodiment, the heat tray 10 is provided to cover the entire bottom of the food tray 30 to facilitate even heat distribution across the entire food tray 30. Corresponding rectangle, kidney bean, oval, square, circular, and other shape arrangements are contemplated.

Figure 8:
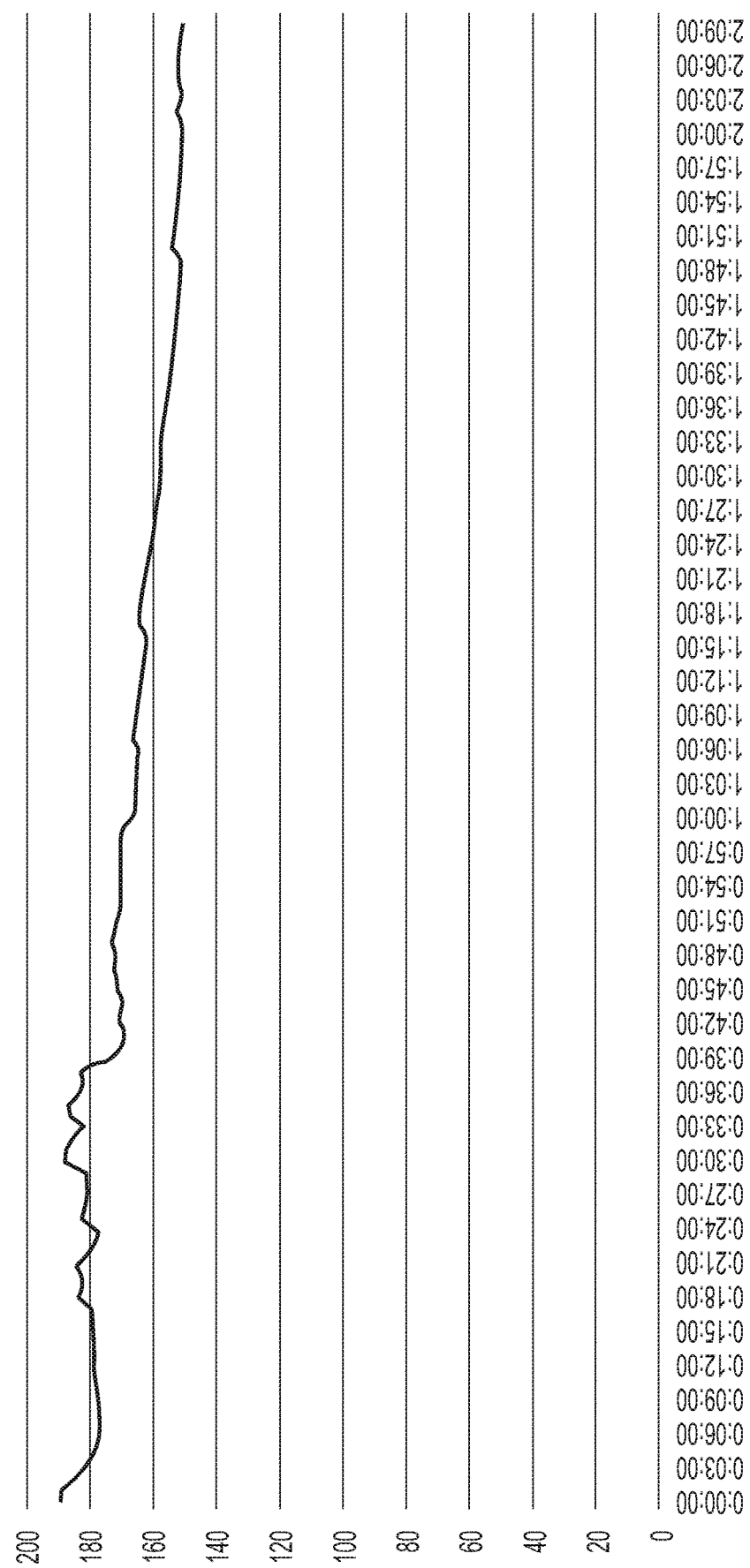
FIG. 8 depicts a temperature vs. time curve for an exemplary heat tray system heating/warming a chaffing dish of food.

FIG. 8 depicts an exemplary heat versus time curve for a heat tray assembly of the present disclosure heating the contents of a food tray. The food tray in this embodiment is a half-pan chaffing dish of 1.61 kg of chicken enchiladas over rice. The composition of the 80 gm of exothermic reactant in this embodiment is listed at the top of the curve. As can be seen, the temperature began a little over 180° F., which temperature was held for a prolonged first time period (here about 40 minutes), where an elevated temperature continued and was monitored for over two hours. At the end of the monitored time period the contents of the food tray were at about 150° F. Based on the curve, the temperature of about 150° F. or slightly below or about 140° F. would be maintained for a time period much longer than 2 hours.

Figure 9:
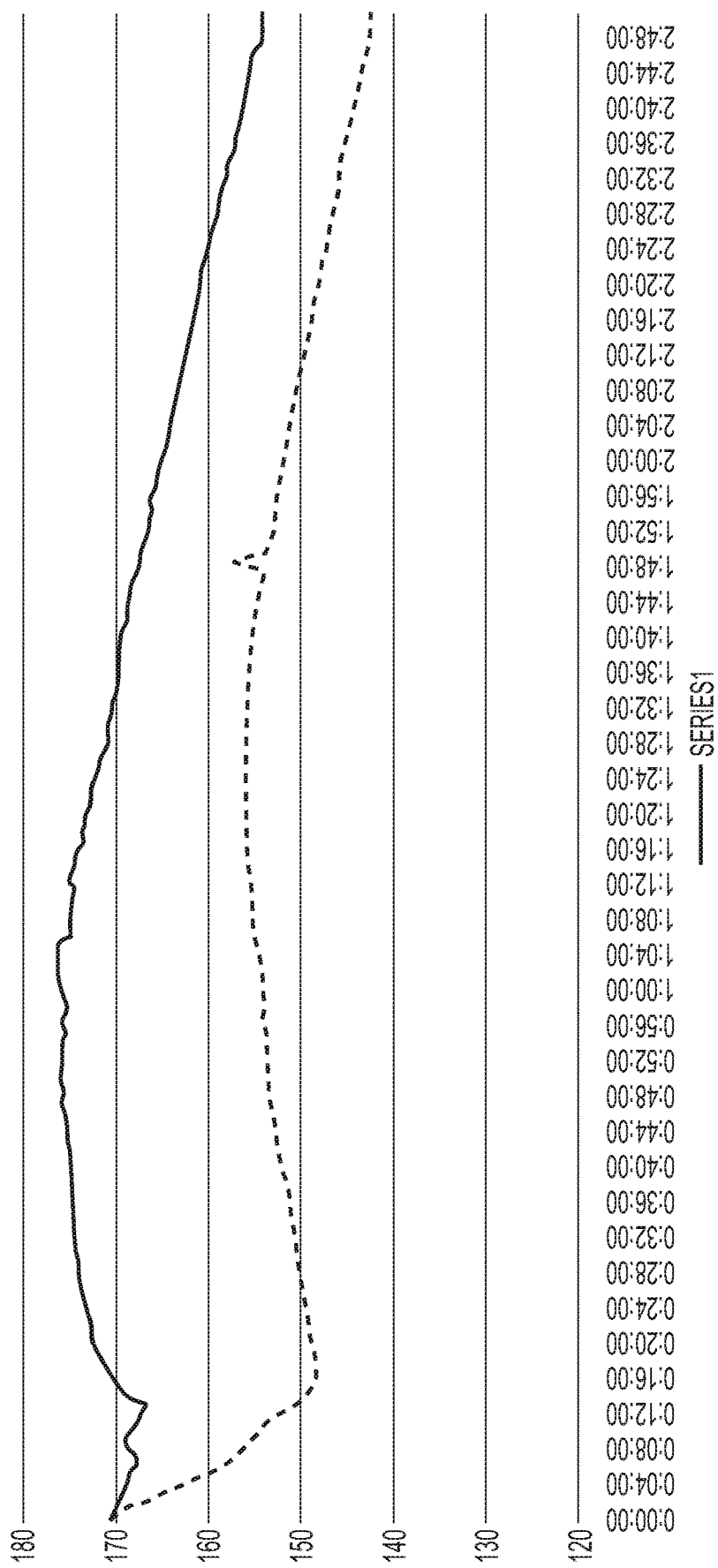
FIG. 9 depicts another temperature vs. time curve for an exemplary heat tray system heating/warming a chaffing dish of food.

FIG. 9 depicts another exemplary heat versus time curve for a heat tray assembly of the present disclosure heating the contents of a food tray. The food tray in this embodiment is a half-pan chaffing dish of chicken thighs. Two temperature probes are provided that monitored the temperature of the contents of the food tray. As can be seen, the temperature began at 171° F., which temperature was held for a prolonged period of time, including a brief initial probe adjustment followed by an increase in temperature and a gradual decrease in temperature over 2 hours and 48 minutes of monitoring time. At the end of the monitored time period the blue probe measured about 154° F. and the gold probe measured about 142° F. Based on the curve, the elevated temperature would be maintained for a time period extending beyond the monitored 2 hours and 48 minutes.

Figure 10:
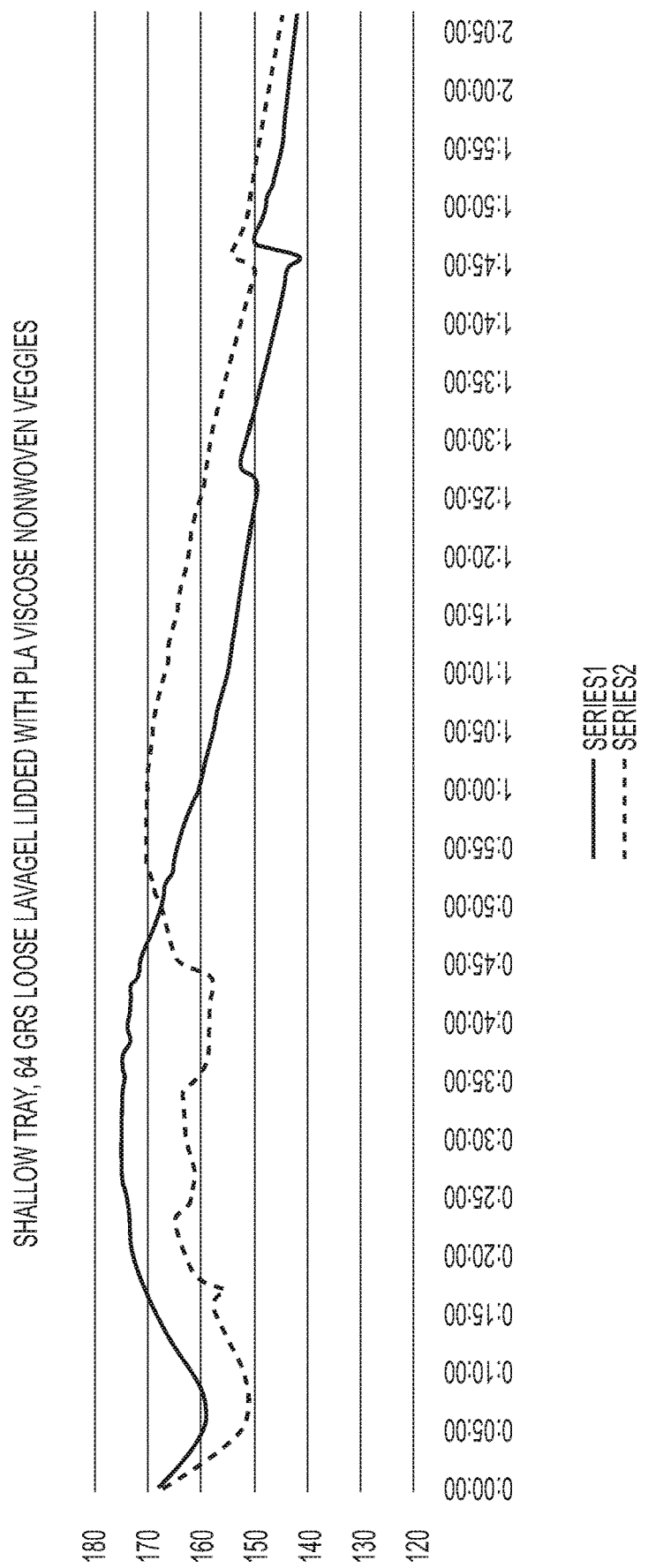
FIG. 10 depicts another temperature vs. time curve for an exemplary heat tray assembly heating/warming a chaffing dish of food.

FIG. 10 depicts another exemplary heat versus time curve for a heat tray assembly of the present disclosure heating the contents of a food tray. The food tray in this embodiment is a shallow tray containing vegetables. 64 grams of loose exothermic reactant are included and reacted in this embodiment. Two temperature probes are provided that monitored the temperature of the contents of the food tray. As can be seen, the temperature began at about 170° F., which temperature was held for a prolonged period of time, including a brief initial probe adjustment followed by an increase in temperature and a gradual decrease in temperature over 2 hours and 5 minutes of monitoring time. At the end of the monitored time period the Series 1 probe measured about 141° F. and the Series 2 probe measured about 145° F. Based on the curve, the elevated temperature would be maintained for a time period extending beyond the monitored 2 hours and 5 minutes.

Figure 12:
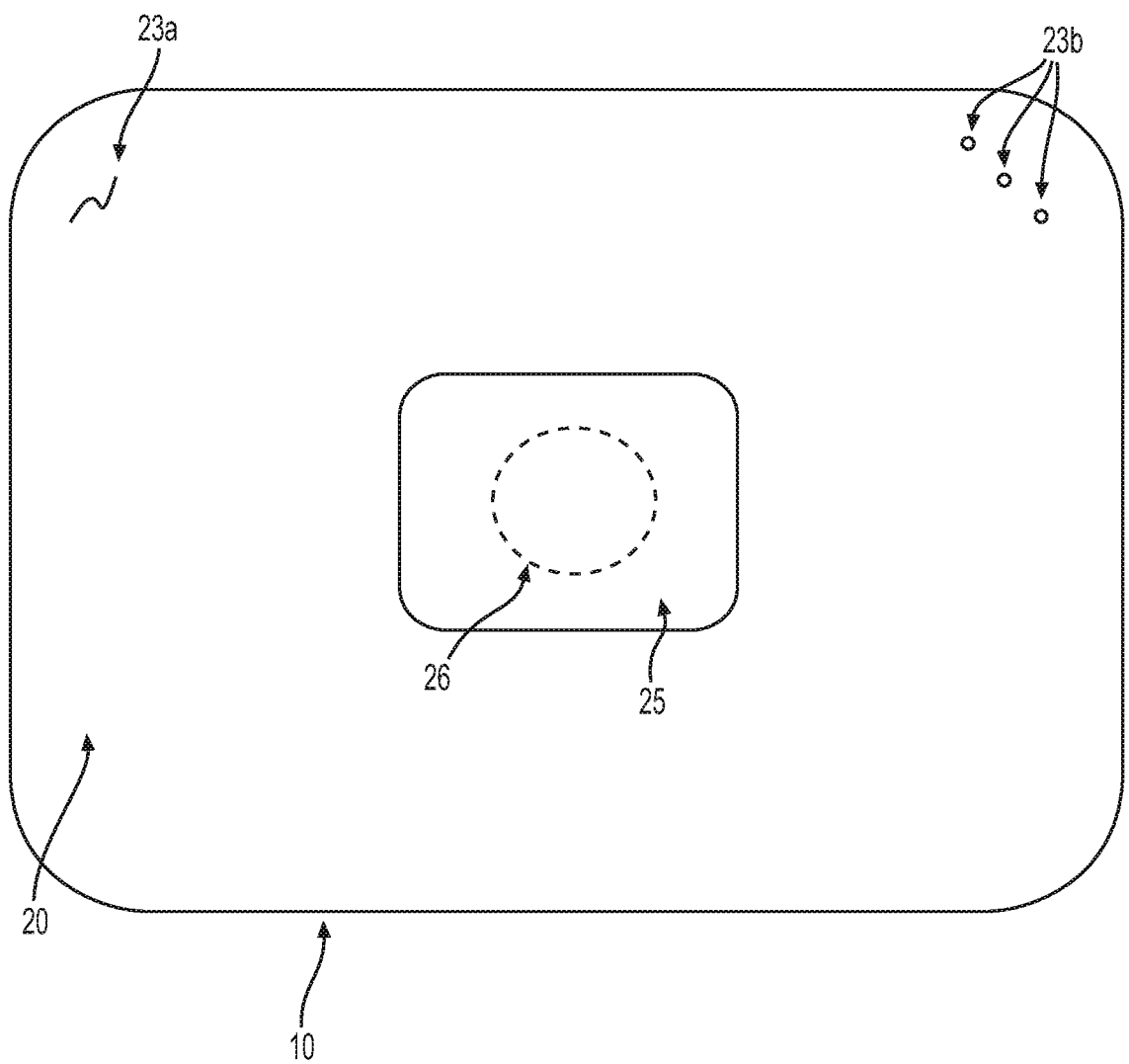
FIG. 12 depicts a schematic representation of another embodiment of a heat tray assembly of the present disclosure having an adjustable-tab covering an opening in the barrier film.
Figure 13:
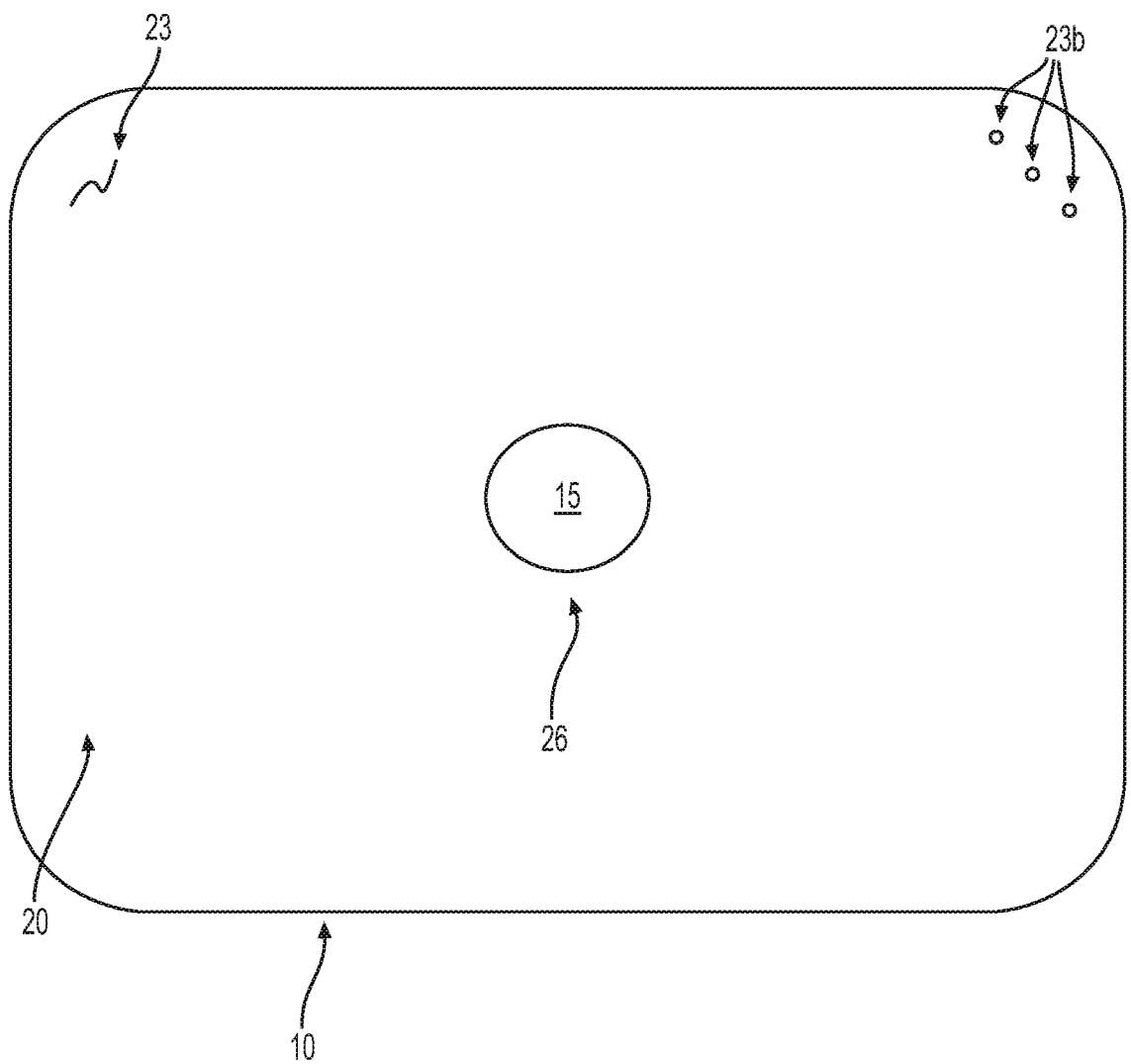
FIG. 13 depicts a schematic representation of an adjustable-tab opening embodiment of a heat tray assembly of the present disclosure lacking the pull-tap.

Heat tray systems include multiple embodiments of the heat tray assemblies according to the present description. Such heat tray systems often include a heat tray assembly that provides for introduction of activator liquid through an activation port 26. FIGS. 12 and 13 depict an exemplary embodiment in this regard. Such systems may include everything needed to activate the exothermic reaction, except water, which can be obtained by the end-user. Although water may also be included in a package with the heat tray assembly 10.

Figure 11:
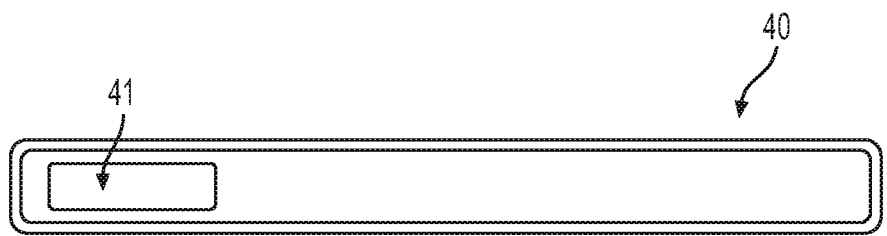
FIG. 11 depicts an exemplary stir stick having an activator reagent pocket.

In such systems, a vehicle for providing an electrolyte solution to the exothermic composition is provided. FIG. 11 depicts one such embodiment in the form of a stir stick 40. A variety of other configurations are contemplated. The stir stick 40 depicted in FIG. 11 provides an elongate support with a location for positioning an electrolyte 41 at one end. This location may, as in the depicted embodiment, include an well or trough positioned in the support adapted to hold an electrolyte composition such as a granular crystalline composition such as salt. The well may optionally be enclosed with a water-permeable or water-dissolvable membrane such that the electrolyte composition does not spill when the stir stick is in transport. Such an embodiment permits a precision placement of a pre-determined amount of electrolyte in advance of use, enabling simple, accurate, and reliable use by an end-user. In an alternative embodiment, a well is positioned in the stir stick and its volume is adapted to hold a pre-determined amount of electrolyte similar to a measuring spoon. In certain related embodiments, a pre-determined amount of electrolyte composition is provided in a permeable or dissolvable sachet that may be used in a stand-along manner or used together with the stir stick. In such embodiment, the stir stick may or may not include a location for placing the electrolyte composition. In other related embodiments, the stir stick itself is at least partially or fully formed of a pre-determined electrolyte composition that begins to dissolve after or upon contact with water.

The stir stick may be formed of any suitable material, including natural or synthetic materials. For example, the material forming the stir stick may be a natural or synthetic biodegradable polymer. The material may also comprise a natural material such as wood or fungal hyphae.

The electrolyte composition is often provided in the form of a crystalline composition having a certain color, e.g., blue, orange, red, green, yellow. The coloration may be provided by the hue of the natural minerals in the electrolyte or by an externally applied coloring agent such as food-grade food coloring. The coloration of the electrolyte composition is provided to impart a pre-determined color to the electrolyte solution made therefrom when it is dissolved in liquid such as water. In application, the electrolyte composition is contacted with water and the color of the electrolyte composition diffuses from the electrolyte composition as it dissolves to impart that color to the resulting solution. An end user can determine quickly when the activator solution is properly prepared when it has the desired/pre-determined color hue, and without undissolved granules. The color change indicates full dissolving of the mixture, thereby insuring that the electrolyte composition is fully dissolved before being poured over the exothermic composition. This ensures that the electrolyte composition is added in the correct percentage to the water and exothermic composition by an untrained user of the heat tray system.

The presently contemplated heat tray systems often include a manner for measuring liquid to be combined with the electrolyte composition to provide a pre-determined volume of activator liquid (not depicted). The most frequent embodiments in this regard include a disposable measuring cup. While the term "cup" is used, it is intended in the broadest manner and does not imply a specific volume or shape other than being able to accept a volume of liquid in its interior. Often the measuring cup is in the form of a foldable assembly, or lay-flat stand-up gusseted pouch, that can lie flat for packaging and folds out to create a cup arrangement having in inner volume adapted to accept a pre-determined amount of liquid. Often the cup is comprised of coated paper that can withstand the preparation of an activator solution (e.g., by dissolving an electrolyte composition) but thereafter may loses its integrity and/or is biodegradable. Often the measuring cup is a vessel comprised of any material and capable of accepting a pre-determined volume of liquid. In certain embodiments, the electrolyte composition is positioned inside the activator cup. In certain embodiments the electrolyte composition is positioned inside the activator cup without the use of a stir stick.

The pre-determined amount of electrolyte is useful according to the present disclosure for both accurate and reliable activation of the exothermic composition and for tailoring the magnitude of the resulting exothermic reaction. In this regard, an amount of electrolyte is often selected for dissolution in a pre-determined volume of water. This yields a pre-determined solute concentration in the activator liquid. The pre-determined solute concentration is often selected to provide for a lower temperature reaction that lasts longer, or a higher temperature reaction that lasts a shorter period of time. Often in such embodiments, the volume of exothermic composition in the heat tray assembly remains constant yet the pre-determined solute concentration is varied to tailor the temperature and duration of the exothermic reaction. In application it has been found that providing a longer duration and lower temperature reaction is useful for food service applications when the food will be transported or stored for a range/period of time prior to serving, such as in a food delivery or catering scenario. Also in application, it has been found that providing a shorter duration and higher temperature reaction is useful for food service applications when the food will be brought to a proper and safe serving temperature such that the food is cooked to, brought to, or maintained at a specific temperature.

FIGS. 12 and 13 depict a top view of an exemplary heat tray assembly 10, for use in a heat tray system. The heat tray assembly of FIG. 12 is covered with a barrier film 20 having a plurality of vent openings 23a, 23b, 26. An adjustable tab 25 is positioned over the activation port 26. The adjustable tab 25 may be removable or peelable, for example, in the form of an at least partially adhesive-backed paper or film. The adjustable tab may also be integrated with the barrier film 20 and capable of sliding between open and closed positions. The adjustable tab 25 may also be adjustable between different physical arrangements relative to the activation port 26, ranging from completely blocking/closing the activation port 26, to partially blocking the activation port 26, to not blocking the activation port 26 at all.

According to frequent embodiments, in use the adjustable tab is adjusted to expose the activation port, into which an activator solution is introduced. The activator solution then permeates the exothermic composition and initiated the exothermic reaction. Often the activator solution permeates through the permeable membrane 15 upon introduction through the activation port 26. Once a pre-determined volume of activator solution, or concentration of electrolyte, is introduced through the activation port 26, the adjustable tab 25 is adjusted to close or block the activation port 26.

The arrangement of features in such embodiments promotes uniform activation of the exothermic composition and inhibits spilling of any solid or liquid components of the heat tray assembly or system, before or after activation.

The barrier film 20 also optionally includes vent openings 23a and/or 23b. These vent openings may be in the form of a slit or cut 23a or punctures, ports or holes 23b. The purpose and positioning of the openings often is predetermined. For example, the ports are often utilized to inhibit or prevent ballooning of the barrier film 20 after activation of the exothermic composition. Ballooning here is intended to refer to upward arced swelling of the barrier film 20 relative to the heat tray 10 base. This ballooning phenomena potential arises from, for example, the generation and release of gasses during the exothermic reaction and/or swelling of the exothermic composition (in the case of an expandable/swellable exothermic gel such as in LAVA GEL®). The heat tray assemblies are adapted to heat items placed on top of the barrier film 20. As such, swelling of the barrier film is a sub-optimal condition relative to providing full conductive heating transfer potential to the items to be heated since it decreases the area of contact between the heat tray and the item to be heated. Vent openings 23a, 23b, are positioned in the most frequent embodiments at the outer periphery of the heat tray to optimize venting, reduce barrier film swelling, and reduce the likelihood of them being covered/blocked by an item to be heated resting on the heat tray or otherwise clogged. Depending on the intended application and the level and/or duration of heat to be imparted by the heat tray, the vent openings may be adapted in number, shape, positioning on the barrier film surface, and/or size. In certain embodiments, the vent openings are positioned in the adjustable tab 25.

The presently contemplated heat tray systems often provide for a multi-phased heating profile. In such embodiments, a heat tray system such as described above in connection with FIGS. 11-13 is provided and activated. Once the adjustable tab is closed over the tray the exothermic reaction begins at a first maintenance level. Thereafter an item to be heated is placed upon the activated heat tray assembly, which although not wishing to be bound by any theory of operation, promotes a further mixture and rearrangement of reactants thereby triggering a second heating level. Most frequently, the second heating level is at a higher temperature than the first maintenance level. In such embodiment, no external reagents or substances are added to the exothermic composition to trigger the change from the first maintenance level to the second heating level.

Such a multi-phased heating profile is useful, for example, in food service when multiple heat trays are required. In such scenarios a user of the trays activates one or more trays at a first maintenance level, which trays are thereafter triggered into a second heating level upon contact with an item to be heated such as a food tray or other take-out food container known in the art. Often the user simultaneously or sequentially activates a plurality of trays at a first maintenance level, which trays are thereafter triggered into a second heating level upon contact with an item to be heated.

In certain embodiments, thermochromic ink particles are included in the exothermic composition. These particles are provided to change the color of the exothermic composition from a first unactivated color to RED, for example, when the exothermic composition is activated and reaches at or above a pre-determined temperature. Such embodiments provides a basic visual sue for whether the exothermic reaction is occurring or on track.

The presently provided heat tray assemblies provide for portable heating of the contents of a tray for a prolonged period of time at an elevated pre-determined temperature range. No electricity or open flames are required; thus the present heat tray assemblies are fully portable and permit heating or warming even while moving in transport. Moreover, rough handling of the heat tray assemblies prior to use does not affect the heating performance of the heat tray assemblies of the present disclosure such as the case for example in transport and/or storage in a catering business, food delivery, or another mobile food or meal provider setting. In applications such as mobile food delivery or mobile meals (e.g., meals on wheels), the food contained in a tray or another food storage or serving arrangement such as a reusable food container (e.g., GoBox) can be warmed cooked in a thermo-enclosure such as an insulated bag or insulated food carrier. Such enclosed and insulated environments provide for heating, cooking, or warming food for a prolonged time to provide remote (in location and/or time) delivery or presentation of heated food/meals.

Unlike the present solution, flamed heaters are not for use while in transit. Currently with flamed heater approaches (Sterno), food arrives at a location but catering has to arrive much earlier to set-up and heat up water and also activate the flamed heaters. Moreover, flamed heaters produce uneven heating and hot-spots on heating surfaces that is diffused by the water. But, uneven heating in this environment is inevitable. Thus, once the food is on its respective heating unit, it is known that the food inside the container is heated unevenly and that the food tends to get soggy in the middle and tougher/overcooked/dry towards the outer portions of the food container. Advantageously, the food and the labor using the herein disclosed system is able to provide food and show up at the same time since the food could be delivered already in communication with the disclosed flameless heating system.

The herein disclosed solutions address the uneven heating problem by providing a uniform heating profile across contents of the food container through the arrangement of the heater tray assembly discussed herein. Also, the heater tray assemblies of the present disclosure permit the use of varying amounts (i.e., weights or volumes) of exothermic reactant that are optionally tailored to the specific application. In this regard, an exothermic reactant amount is pre-determined to provide a pre-determined heat level for a pre-determined duration. While the specific temperature of the food or other item being heated may vary based on density, arrangement, constituent parts, and/or volume the amount of heat delivered to the item can be predetermined. Based on known features of the item to be heated, a specific amount of exothermic reactant is often provided to heat the item to a specific temperature for a specific duration. In one embodiment, the heat tray assembly heats food in a food tray to between about 140 F to 170 F, and maintains that temperature or range for over three hours. In one embodiment, the heat tray assembly heats food in a food tray to between about 140 F to 170 F, and maintains that temperature or range for over two hours. In one embodiment, the heat tray assembly heats food in a food tray to between about 140 F to 150 F, and maintains that temperature or range for over two hours. In one embodiment, the heat tray assembly heats food in a food tray to about 140 F, about 145 F, about 150 F, about 155 F, about 160 F, about 165 F, about 175 F, or about 180 F, and maintains that temperature or range for over one hour, or over two hours, or over three hours. In the present embodiments, therefore, the heat tray assembly will heat food, but not overcook it.

In use an exemplary heat tray assembly is activated by peeling back a flap of the barrier film, removing the activator solution pouch, opening the activator pouch, pouring the contents of the pouch in the interior of the heater tray opn the permeable membrane where the solution permeates to the exothermic reactant, the exothermic reactant absorbs the activatory solution swells up and rises in temperature. The tray with contents (e.g., food) is then placed on the heater tray to heat the contents.

A variety of exothermic reactants may be utilized in the presently described embodiments with LAVA GEL® (Forever Young International, Inc., Las Vegas, NV), which is known to exhibit a very controlled temperature for an extended period of time, with simply the addition of water or an electrolyte solution, such as saline water (as the activator). The use of an exothermic gel, such as LAVA GEL® provides important advantages. Where activator is water, the gel sequesters the water. The exothermic gel expands (relative to the volume of the dry powder mixture) within the base of the heater tray and presses against the permeable membrane. A food tray sitting on the permeable membrane compresses the gel and the gel adapts to match the contours of the food tray and thereby provide uniform contact and conductive heating of the food tray. This allows the exothermic gel formed from the exothermic reactant and the activator liquid to quickly and evenly heat the food tray.

As such, the exothermic reactant is generally a combination of reactants such as a first exothermic reactant that may be material that undergoes an exothermic reaction when combined with an activator solution such as water or an electrolyte solution. For example, first exothermic reactant may be a magnesium-iron alloy powder that is exothermically reactive with an electrolyte solution such as saltwater. The exothermic reactant frequently comprises an exothermically reactive powder mixed with a super absorbent polymer (SAP) powder. When water or electrolyte solution is added to this mixture, an exothermic reaction generates heat while the SAP powder forms a gel. The gel absorbs and retains the generated heat for a prolonged period of time due to the high specific heat capacity of water or water-based gels compared to relatively non-absorbent powders. In frequent embodiments, the exothermic reactant fluffs up in volume when it creates the exothermic gel to create a fluffed heated gel. This reaction remains adequately warm for the contemplated heating purposes, while avoiding scalding hot temperatures that would otherwise inflict injury on the user or burn food.

In certain embodiments, multiple stage heating is provided that has multiple distinct activation phases where a new or renewed exothermic reaction is induced in the heater tray at a time period distant from a prior exothermic reaction being induced in the heater tray. An example of a multiple stage reaction of the general type contemplated using exothermic reactants may be that of US Patent Application Publication No. 20150297394. Each pf the multiple heating stages may be characterized by a different heating profile. For example, a cooking or initial heat-up stage may be provided as a first stage to cook food using a high temperature for a specific duration, followed by a warming stage that provides heat at a lower temperature and for a longer duration. Often the first stage is shorter than the second stage. In such embodiments uncooked food can be cooked and warmed for a prolonged duration in a mobile environment with minimal or no human intervention apart from initiating the first and optionally second reaction, and with no electricity or flames.

Other exothermic reactants are contemplated for use in the present heater tray assemblies, such as those disclosed in Patent Cooperation Treaty Application No. PCT/US2017/066208, filed Dec. 13, 2017 and U.S. Provisional Patent Application No. 62/433,766, filed Dec. 13, 2016. Both of which are incorporated by reference in their entirety.

According to the present disclosure, the heat tray is most frequently formed of a biodegradable or compostable material. In certain embodiments, the heat tray is self-compostable. In one exemplary embodiment of a self-compostable heat tray, the heat tray is comprised of poly lactide plastic and mesophilic bacterial are incorporated in the exothermic composition or activator solution. A variety of suitable bacterial strains are contemplated in this regard, including *Amycolatopsis, Brevibacillus, Bacillus smithii, Geo bacillus thermocatenulatus, Bacillus smithii*, Paeni *bacillus amylolyticus, Bordetella petrii, Pseudomonas*, and *Bacillus amyloliliquefaciens*. Suitable strains are mesophilic, or more preferably thermophilic or thermotropic if incorporated in the exothermic composition, in that they survive and and/or grow during or after the heat generated in the exothermic reaction. Such bacterial grow/expand in heightened temperatures. In certain embodiments, the heat tray assembly or system includes a self-compostable heat tray having the aspects and components described herein, in addition to a mesophilic and/or thermophilic bacterial strain that produces enzymes capable of degrading a biodegradable polymer.

A temperature sensor/reporting communication system is provided in certain contemplated embodiments. Such a system enhances safeguards for food safety, and compliance and enforcement of food safety rules. In an exemplary embodiment a data collection system is provided in the heat tray system. Such heat tray systems are often intended for delivery of corporate or individual meals.

According to such embodiments, a data collection device such as a microchip or NFC passive printed circuit coupled with one or more sensors, such as a temperature sensor. In certain embodiments the data collection device is powered by the Peltier Effect (e.g., the heat provided by the exothermic reaction). In certain other embodiments, an external power source, if needed, is utilized to power data communication from/ro the data collection device. This data collection device is also optionally in certain embodiments included in a transport container containing one or more heat tray assemblies. In such embodiments, a data collection device may or may not also be included in the heat tray assembly. In the most frequent embodiments, the data collection device is adapted and positioned in a manner that provides an indication of the temperature of a food item or the ambient environment surrounding the food item. This data collection device is most frequently provided in local wireless data communication via a wireless communication method known and available in the art such as BLUETOOTH®, Near Field Communication (NFC), ZigBee, Radio Frequency Identification (RFID), etc. to a mobile device such as a mobile phone. The mobile device may optionally be provided in data communication with a database or data storage device in a wired or wireless manner. In practice, the data collection device provides real-time monitoring of the temperature of the heat tray, or its surrounding environment, to generate temperature data. This temperature data is communicated locally to a mobile device that optionally, but frequently, includes a mobile application adapted for such data monitoring. This data or a permutation thereof may be pushed or uploaded and stored to a remote database such as a cloud-based server or location. The data may be used for compliance monitoring or also provided as a service for use by customers. In certain embodiments, a printout, recordation or communication (e.g., email, text, etc.) is provided to the food provider, delivery service, customer, and/or end delivery location that provides information of or about the temperature or other environmental data collected by the data collection device.

In certain embodiments, a mobile device application is provided that collects, interprets and communicates the environmental (including temperature) and/or consumer data as described herein in an actionable form by the end-user.

In certain other food safety embodiments, a series of symbol, design, picture, shape, or barcode labels are provided, wherein the barcodes are printed in thermochromic ink or leuco dye that transitions between colorless/clear or translucent to opaque/dark/black/colored at a certain temperature or range of temperatures (collectively referred to herein as leuco dye). One or more different leuco dyes are utilized on a single heat tray assembly according to the presently contemplated embodiments, each having a different transition temperature. In certain embodiments, the heat tray includes two or more different leuco dyes on a single heat tray assembly according to the presently contemplated embodiments, each having a different transition temperature. In certain embodiments, the heat tray includes three or more different leuco dyes on a single heat tray assembly according to the presently contemplated embodiments, each having a different transition temperature. According to often included embodiments, a symbol, design, picture, shape, or barcode printed in leuco dye is visible at a certain predetermined temperature so that a user can determine that the heat tray is at that temperature or within a predetermined temperature range without having to use a thermometer. Often according to related embodiments, the symbol, design, picture, shape, or barcode is imaged by a mobile device operably connected with a mobile application that records and/or reports the temperature of the heat tray. Using functionality provided in the mobile device, the location and time of the time of imaging the symbol, design, picture, shape, or barcode is also often simultaneously collected or recorded. In application in a food delivery scenario, a discernable symbol, design, picture, shape, or barcode on the heat tray is imaged at or about the time the food item or food container is placed in heat communication with the heat tray and then again at a later time. This later time is often at the time of drop-off or delivery of the food item, also often the later time also includes an intermediate time period such as when the food item departs the food preparation location such as a restaurant or kitchen.

Additional data may also be collected and included it provided in functional data communication with the mobile application. For example, food related life-style based trends, demographics, location-based ordering, methods of ordering and other data may also be collected. Such data may be provided to or used by companies to tailor services or advertising, healthcare providers, and/or regulatory agencies.

Other features and advantages of the invention will be apparent from the following detailed description, and from the claims.

Citation of the above publications or documents is not intended as an admission that any of the foregoing is pertinent prior art, nor does it constitute any admission as to the contents or date of these publications or documents.

One skilled in the art will appreciate further features and advantages of the presently disclosed methods, systems and devices based on the above-described embodiments. Accordingly, the presently disclosed methods, systems and devices are not to be limited by what has been particularly shown and described, except as indicated by any appended claims. All publications and references cited herein are expressly incorporated herein by reference in their entirety and/or for the specific reason for which they are cited herein.

I claim:

1. A heater tray system, comprising:
   a tray comprising an exothermic reactant sealed between an inner lower surface of the tray and
   a permeable membrane layer connected along an upper circumferential perimeter of the tray;
   a barrier layer positioned over the permeable membrane and attached to the tray to enclose the permeable membrane layer between the tray and the barrier layer;
   an activation port positioned in the barrier layer over the permeable membrane providing fluid access of an activator solution to the permeable membrane; and
   a temperature communication system comprising one or more temperature sensors and a data collection device;
   wherein the exothermic reactant is configured to form an exothermic gel when the activator solution is introduced through the activation port through the permeable membrane and mixed with the activator solution.

2. The system of claim 1, wherein the exothermic reactant comprises an exothermically reactive powder mixed with a super absorbent polymer (SAP) powder, and wherein the data collection device comprises at least one of a microchip or a near field communication (NFC) passive printed circuit coupled with the one or more temperature sensors.

3. The system of claim 2, wherein the data collection device is configured to be powered by heat provided by the exothermic gel.

4. The system of claim 2, wherein the data collection device is configured for real-time monitoring of a temperature of the tray, or its surrounding environment, to generate temperature data.

5. The system of claim 2, wherein data from the data collection device is configured to be stored by the data collection device in a remote database.

6. The system of claim 2, wherein the data collection device is configured to transmit a communication message to at least one of a food provider, a delivery service, a customer, or an end delivery location.

7. The system of claim 2, wherein the data collection device is configured to wirelessly transmit temperature data to a computing device configured to interpret the temperature data.

8. The system of claim 7, wherein the computing device is a mobile device.

9. The system of claim 2, wherein the data collection device is configured to wirelessly transmit data to a computing device that collects, interprets and communicates at least one of temperature data, location data, time data, or consumer data from the data collection device.

10. The system of claim 2, wherein the tray further comprises a barcode comprising thermochromic ink configured to transition between translucent and opaque across a range of temperatures, wherein the barcode is imageable by a mobile device to record and/or report temperature data of the heat tray.

11. The system of claim 2, wherein the tray further comprises a barcode comprising leuco dye configured to transition between translucent and opaque across a range of temperatures.

12. A method of using the heater tray system of claim 1, comprising:
   introducing the activator solution through the activation port of the barrier layer; and
   permeating the activator solution through the permeable membrane to mix with the exothermic reactant and form the exothermic gel;
   wherein heat generated from the exothermic gel is used to warm contents within a container of the heater tray system for a pre-determined duration of time at a pre-determined temperature range.

13. The method of claim 12, further comprising: closing the activation port after a predetermined volume of the activator solution is introduced through the activation port, wherein the pre-determined duration of time is from about 40 minutes to about two hours and the pre-determined temperature is greater than 140° F., wherein contents of the container are heated to at least 140° F. for the pre-determined duration of time.

14. The method of claim 12, further comprising:
   monitoring, by a data collection device of the system, a real-time temperature of at least one of the system, the contents, or a surrounding environment, to generate at least one of temperature data, location data, or time data,; and
   collecting, interpreting, and communicating the least one of temperature data, location data, or time data from the data collection device to a computing device.

15. A heater tray system comprising:
   a tray comprising an exothermic reactant sealed between an inner lower surface of the tray and a permeable membrane layer connected along an upper circumferential perimeter of the tray, the exothermic reactant comprising an exothermically reactive powder mixed with a super absorbent polymer (SAP) powder;
   a barrier layer positioned over the permeable membrane and attached to the tray to enclose the membrane layer between the tray and the barrier layer;
   an activation port positioned in the barrier layer over the permeable membrane providing fluid access of an activator solution to the permeable membrane; and
   an adjustable tab positioned over the activation port to provide a seal of the activation port that prohibits fluid entry when in a closed position;
   wherein the exothermic reactant is configured to form an exothermic gel when the activator solution is introduced through the activation port through the permeable membrane and mixed with the activator solution.

16. The system of claim 15, wherein the barrier layer is positioned to cover the permeable membrane, and the barrier layer is not sealed to the tray.

17. The system of claim 15, wherein the tray is comprised of a biodegradable or compostable material.

18. The system of claim 15, further comprising a dissolvable electrolyte composition and a stir stick.

19. The system of claim 18, wherein the dissolvable electrolyte composition comprises a colored dissolvable electrolyte composition configured to form an electrolyte solution having a pre-determined color when the dissolvable electrolyte composition is dissolved.

* * * * *